June 12, 1956
J. MOON
2,750,569
IRREVERSIBLE TOOL JOINT AND ELECTRICAL
COUPLING FOR USE IN WELLS
Filed Jan. 8, 1952
2 Sheets-Sheet 1
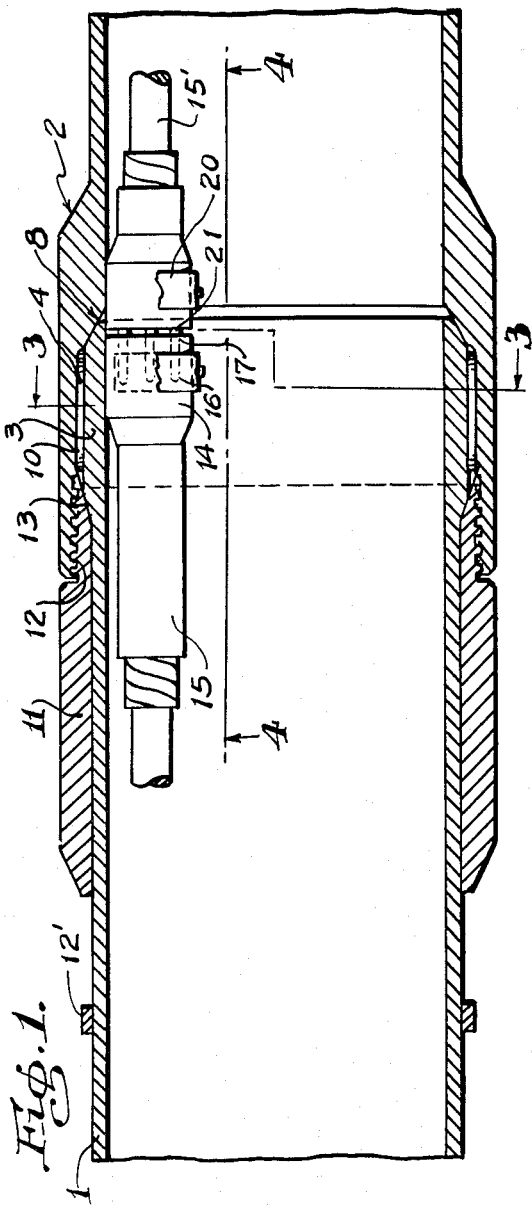
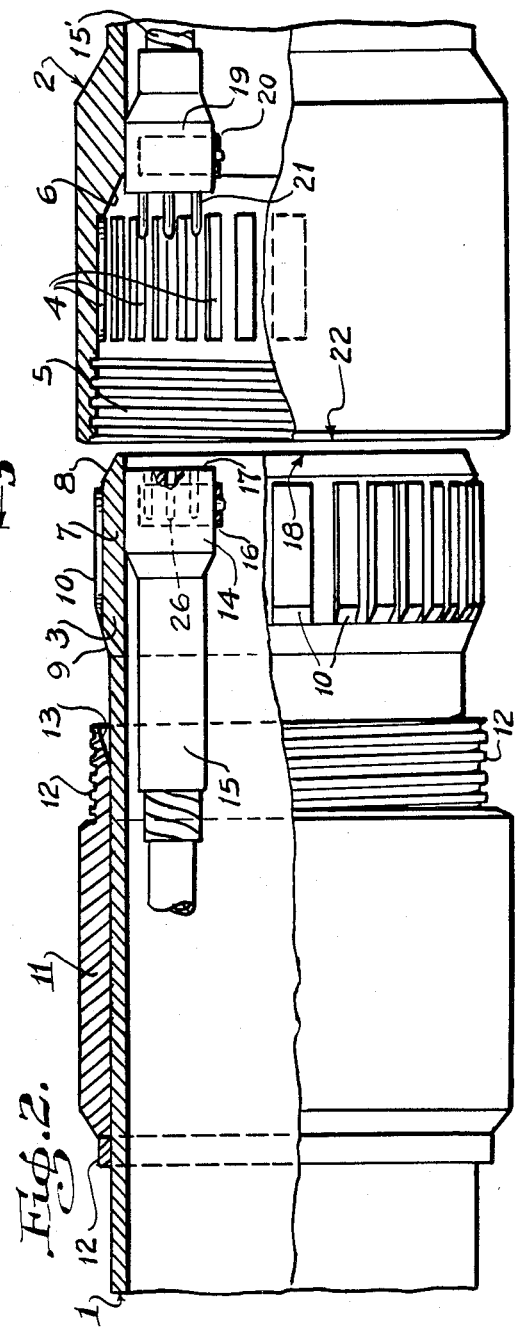
*INVENTOR.*
JAMES MOON
BY
*ATTORNEY.*

June 12, 1956  J. MOON  2,750,569
IRREVERSIBLE TOOL JOINT AND ELECTRICAL
COUPLING FOR USE IN WELLS
Filed Jan. 8, 1952  2 Sheets-Sheet 2
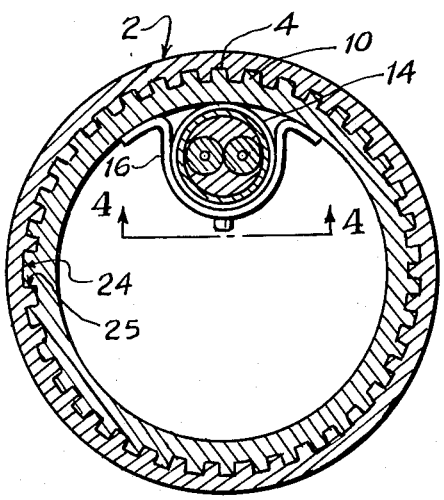
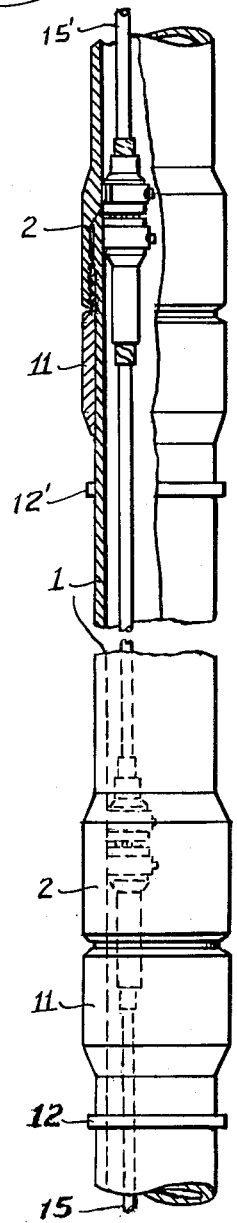
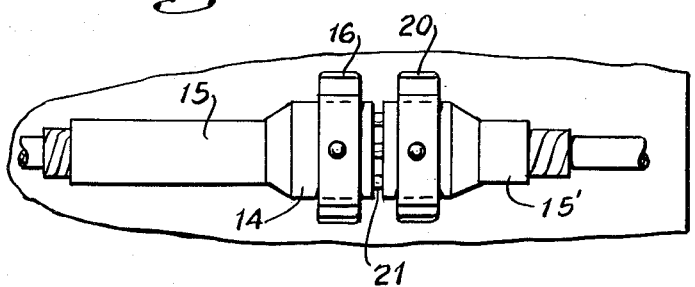
INVENTOR.
JAMES MOON
BY
ATTORNEY.

United States Patent Office 2,750,569
Patented June 12, 1956

2,750,569

IRREVERSIBLE TOOL JOINT AND ELECTRICAL COUPLING FOR USE IN WELLS

James Moon, Corona del Mar, Calif., assignor to Signal Oil and Gas Company, Los Angeles, Calif., a corporation of Delaware Application January 8, 1952, Serial No. 265,458

3 Claims. (Cl. 339—16)

This invention relates to the support and assembly of electrical and other cables in pipe sections, especially in pipe sections such as drill pipe sections employed in oil well drilling.

There are many needs for cables in oil wells. Thus, for example, it has been proposed to lower electrically driven pumps at the end of tubing lowered into an oil well, through which tubing the pump may pump the oil to the top of the ground. A somewhat similar use of electrical power is in the use of a drilling motor to which a drill is attached and which motor is lowered into the well and positioned near the bottom thereof.

Other uses of cable and particularly electrical cable is in the electrical measurement taken in the oil well or in the operation of instruments which require electrical cables to be lowered into the oil well.

In all such cases in which the cable must attain great length, the problem of supporting the cable so that the weight of the cable does not cause the cable to draw out, part, or be stripped from the insulation is a serious one. Thus, in a cable of several thousand feet, up to 15,000', the tension load on the wire may exceed its elastic limit or even its tensile strength. If the wire starts to flow, the insulation may be stripped from the wire and the cable may part.

For that reason it has been suggested by others that the cable be made sectional and mounted inside a pipe such as drill pipe. The drill pipe, as is well known, is sectional and the sections, called stands, are connected by couplings, called tool joints. The previous proposals were to make the cables sectional and to support each cable section inside the pipe section and provide some means of coupling the cables when the stands are assembled at the tool joints as they are lowered into the well.

The difficulty has been that in the prior art the tool joints employed with such stands were assembled by rotation of the stands, requiring that the electrical connections be made up by rotation or that special and elaborate types of electrical connectors be used requiring extensive modifications of the structure of the pipe or tool joints or other pipe connectors.

The problem involved in the provision of a suitable electrical connector is aggravated by the fact that it must be fluid-tight against the high hydrostatic loads which are used in oil wells. For example, the pressure at the bottom of a 15,000' well having a suitable mud in the hole may be 7500# per square inch.

I have found that the most suitable type of electrical connector for such service is a push-pull type plug. Some plugs are entered by longitudinal or axial movement of the male or female plug and they can be made fluid-tight against any pressures conceivably to be met in oil wells. They are also gratifyingly cheap to make and of simple and rugged construction.

Such a push type plug has been disclosed, together with a conventional rotary tool joint in a co-pending application filed by Daniel S. Johnston, Serial No. 265,424, filed January 8, 1952, and no claim is made here of any of the inventions claimed in said application.

In said application, each pipe stand supports a section of cable which carries at one end a female element and at the other the male element of the push type plug. The cable is of sufficient length to hang below the end of the pipe section. Thus, to assemble the pipe section, the plug elements are assembled first by hand and then the tool joint is made up by rotating the box and pin relative to each other, the excess of the cable which has hung below the stand is positioned inside the stand and provides slack to permit the making up of the tool joint by rotation.

While the invention of said application has been found to be highly useful and meritorious, it does involve some hazard in that one must put his hands between the heavy pipe which hangs in the elevators and the pipe in the slips of the rotary. Another difficulty is that the step of assembly of the electrical connections takes time. Considering the number of times which it has to be repeated it may be considerable.

I have devised a combination pipe and cable stand and electrical coupling of the push-pull type, whereby the electrical coupling and the pipe coupling may be made up simultaneously. I accomplish this result by employing, with the push-pull type of electrical cable coupling a tool joint which may be made up without rotation of the pipe sections, so that the joint is assembled by stabbing the pipe, i. e., by an axial motion of the pipe stands.

By so positioning the female or male elements of the electrical connector plug in the pipe, so that when the pipe sections are in position for coupling the male element of the plug has entered the female element, I obtain a simultaneous connection of the pipe section and the cable sections without rotation of either the stands or the cable. I may use any type of tool joint or pipe coupling which may be made up by stabbing one of the elements of the coupling into the other. For example, I may use any of the so-called "irreversible type of tool joints" wherein the pin of the joint enters the box of the joint by "stabbing" and a sleeve or other type of connector is used to hold the box and pin locked against axial displacement. Such types of joints are illustrated in United States Patent No. 2,485,763 and in the co-pending applications Serial No. 246,959, filed September 17, 1951, and Serial No. 642,079, filed January 18, 1946. No claim is made herein to the joints per se, but only to the combination thereof with the cable as stated herein.

These and other objects of my invention will appear from the further description of my invention taken together with the drawings, in which:

Fig. 1 is a sectional view of the tool joint and electrical cables with the joint and plug in assembled form;

Fig. 2 is a view partly in section and with parts broken away, showing the tool joint and plug of Fig. 1 in disassembled form prior to assembly;

Fig. 3 is a section taken on the line 3—3 of Fig. 1;

Fig. 4 is a view taken on line 4—4 of Fig. 3; and

Fig. 5 shows the assembly of the stands and cables.

The pipe 1 has at one end a box 2 and at the other end a pin 3. Between the box and pin is an interlock or clutch mechanism whereby rotary motion may be transmitted from the pin to the box. The interlock or clutch elements on the box and pin are engaged by the axial movement of the box and pin relative to each other.

The specific clutch means employed is a spline connection between the box and pin, although any other driving surfaces for this purpose may be employed, as will be evident to those skilled in the art from the herein description. Thus, interior splines 4 are formed on the interior of the box between the interior threads 5 positioned at the end of the box and the conical shoulder 6 on the interior of the box. It will be noted that the interior diameter of the splines 4 on the box is less than the interior diameter of the threads 5.

The pin 3 has an external upset 7 formed with a conical shoulder 8 at the end of the pin. The splines 10 are positioned on the exterior of the upset 7 adjacent this shoulder.

A collar 11 is positioned on the exterior of the pipe adjacent the pin and between the pin and the stop ring 12' which is fixed on the pipe 1 at a suitable distance from the pin 7 to permit the sleeve 11 to be completely retracted and clear from splines 10. The sleeve is formed with external threads 12 and an internal conical seat 13 at the exterior end of the threaded portion of the collar.

Mounted on the interior of the pin is the female element 14 of a push-pull type of plug positioned at the end of cable section 15 and held in position on the interior of the pin and the clamp 16. As illustrated, the female element is mounted in the pin with the end 17 of the female element positioned inside the pin a short distance from the end 18 of the pin for reasons to be described below. It will be seen that in this position the end 17 is adjacent the conical seat 8.

At the box end of the pipe section 1 the male element 19 is positioned in the interior of the box and adjacent the conical seat 6. It is held in position by the clamp 20. As illustrated, the male element 19 is positioned rearwardly of the splines 4, i. e., away from the end 22. Thus, as illustrated, it is positioned adjacent the conical seat 6. The prongs 21 of the male element project toward the end 22 of the box.

The box and pin are indexed in some fashion so that on assembly of the pin and box the male and female elements will be aligned. When this is accomplished an axial movement of the pin and box relative to each other will enter the pin into the box and the male into the female element of the electrical connector. This is provided by assuring that the pin can enter the box in one position only, i. e., that in which the prongs of the male plug element are aligned with the sockets of the female plug element.

As illustrated here, the means employed for indexing is to make one set of splines different from all others. As illustrated in Fig. 3, spline 24 on the interior of the box and spline 25 on the exterior of the pin are made to be mating, but these will not mate with any of the other splines. The position of the mating splines on the box and pin is such that when the box and pin are rotated with respect to each other, when the spline 24 aligns with spline 25, the pin and box are moved axially with respect to each other; the male and female elements are also aligned and the prongs 21 enter the sockets 26 of the female element. It will be observed that the sockets 26 and prongs 21 are axially aligned prior to the entrance of the pin into the box, so that there is no possibility of injury of the prongs as a result of any misalignment.

The male element is mounted on the inside of the pipe 1 as, for example, adjacent the seat 6, as shown, since in this manner it will not interfere with the entry of the pin into the box. The prongs 21, while they project into the box, are radially displaced from the splines toward the center of the box and are at a distance from the center to permit the pin to pass over the prongs as the pin enters the box. The prongs are thus protected by the pipe against mechanical injury. The female element 14 is also protected by its position on the pin against mechanical injury.

While the female element and the male element may exchange position, I prefer to position the female element inside the pin, since if I were to place the male element inside the pin, I would have to position the plug further inside the pipe in order that the prongs do not project beyond the end 18. This would necessitate that the female element be mounted more closely to the end 22 than is necessary when positioning the male element in the box. This would complicate the support of the element in the box, since support from the side of the box is not practical.

When the pin has entered the box and the electrical connector assembled as illustrated in Fig. 1, the sleeve 11 is pushed forward and the threads 12 screwed into the threads 5. As the sleeve is screwed down the seat 13 rides on the seat 9 and the threads 12 are forced outwardly circumferentially as a result of the resultant strain. The distortion of the threads creates an interference fit between the threads 12 and 5 and locks the sleeve frictionally against rotation. The sleeve thus cooperates with interlocking pipe sections to provide an axial clutch.

In employing the combination tool joint and electrical connector, as stated above, each stand of pipe, made up of singles, doubles, trebles, etc., as is conventional in oil field operations, has a box and pin at each end (see Fig. 5). The box and pin carry the electrical push-pull plug elements, as described above, and the female element, at one end of the stand, is connected by a length of cable 15 to the male element at the other end. Thus, when the string is assembled the cable is also assembled. It will be observed that the cable and plug elements are contained within and are protected by the pipe and the tool joint elements against mechanical abuse.

Thus, for example, pipe stands are often bumped against each other and on the drilling floor and projecting cable from the pipe or cable positioned on the exterior of the pipe may suffer injury. Again, in running pipe in the hole, and particularly slant holes, the pipe is rubbed against the side of the bore hole and cable positioned on the exterior of the pipe suffers injury. In the form of cable and pipe construction of my invention, the cable is protected against such injury.

It will also be observed that the cable is supported at the tool joints and that therefore the load of the cable is transferred to the walls of the pipe periodically along its length, the total unsupported length being one stand.

While I have described a particular embodiment of my invention for the purpose of illustration, it should be understood that various modifications and adaptations thereof may be made within the spirit of the invention as set forth in the appended claims.

I claim:

1. A combination tool joint and cable coupling, comprising a box, a thread in said box, splines on the interior of said box, one of said splines being different from the others of said splines, a pin, splines positioned in the exterior of said pin, one of said last-named splines being different from the others of said last-named splines, said different splines mating with each other and not with the others of said splines, and said other splines on said box mating with the other splines on said pin, a sleeve axially slidable over said pin, a thread on said sleeve matable with said thread in said box, a female plug connector element positioned within said pin on the interior wall of said pin, sockets in said element, a male plug element positioned in said box, prongs protruding from said male element and matable with said sockets, said prongs being positioned adjacent the splines in said box and radially displaced inwardly from said splines toward the center of said box, the angular position of said sockets of said female element bearing an angular relation to the different spline of said pin which is substantially the same as the angular relation of said prongs to the different spline of said box, whereby when the said different splines are mated the prongs enter said sockets.

2. A combination tool joint and cable coupling comprising a box, a pin adapted to be united with said box and to be inserted therein by axial stabbing, rotary clutch means cooperating with said box and pin for transmitting rotary motion therebetween when united, axial clutch means cooperating with said pin and box for preventing axial separation thereof when united, a push and pull type electrical plug connector comprising a male element having prongs projecting therefrom and a female element having sockets oriented to correspond with said prongs, one of said elements being mounted on an inside wall of said box and the other of said elements being mounted on an inside wall of said pin, said elements being so oriented in said box and pin as to provide for mating of said elements when said pin is inserted in said box by stabbing, the circumambient walls of said box and pin being substantially larger than said connector elements housed therein to provide a free area therebetween.

3. A combination tool joint and cable coupling as defined in claim 2, wherein the rotary clutch means comprises mating sets of splines on the pin and box, and wherein one spline of one said set is wider than the others thereof and one spacing between adjacent splines of the other said set corresponds to said wider spline for indexing the prongs and sockets of the plug connector into registry when the pin is stabbed into the box.

References Cited in the file of this patent

UNITED STATES PATENTS

| | | |
|---|---|---|
| 211,833 | Buchtel | Feb. 4, 1879 |
| 2,102,625 | Hubbell | Dec. 21, 1937 |
| 2,089,844 | Anderson | Aug. 10, 1937 |
| 2,096,279 | Karcher | Oct. 19, 1937 |
| 2,301,783 | Lee | Nov. 10, 1942 |
| 2,479,483 | Ekleberry | Aug. 16, 1949 |
| 2,485,763 | Moon | Oct. 25, 1949 |
| 2,563,762 | Uline et al. | Aug. 7, 1951 |